United States Patent Office 3,444,153
Patented May 13, 1969

3,444,153
POLYMERIZATION PROCESS AND
CATALYST FOR OLEFINS
Lawrence M. Fodor, Bartlesville, Okla., assignor to
Phillips Petroleum Company, a corporation of
Delaware
No Drawing. Filed Aug. 16, 1965, Ser. No. 480,103
Int. Cl. C08f 1/54, 3/08
U.S. Cl. 260—93.7                         5 Claims

ABSTRACT OF THE DISCLOSURE

Flexural modulus of solid polymers of olefins is increased and xylenes-soluble content thereof decreased by polymerizing aliphatic 1-olefins in the presence of a catalyst composition formed by mixing (a) a compound of the formula $AlR_3$ wherein R is a member of the group consisting of alkyl, aryl and cycloalkyl radicals having from 1 to 20 carbon atoms, (b) a titanium trichloride-aluminum chloride complex, (c) a compound of the formula $BX_3$, wherein X is a halogen, and (d) a compound of the formula $PX_n$, wherein X is a halogen and $n$ is an integer selected from the group consisting of 3 and 5.

---

This invention relates to the polymerization of olefins to form solid polymers. In one aspect it relates to an improved catalyst for such a polymerization. In another aspect it relates to a process for producing solid polymers of olefins having increased flexural modulus and a decrease in xylenes-soluble content of the polymer.

It is known in the art to polymerize aliphatic 1-olefins such as propylene and 1-butene to form crystalline solid polymers. Catalysts for such a process are often formed by mixing together a compound having a metal-carbon bond with a compound of a transition metal. The activities of various of these catalysts can be improved by the addition to this mixture of a third component such as halogen-containing phosphorus compounds. Still other components can be added to increase activity. It is also known to produce crystalline polypropylene by the use of a catalyst which forms on mixing a trialkylaluminum and titanium trichloride. This type of catalyst and process are disclosed in Belgian Patent 549,638.

Catalysts of the organometal type vary widely in activity and in the properties of the polymers which they produce. In the production of crystalline polypropylene, it is desirable to obtain not only high yields in the polymerization process but also a polymer which has a high flexural modulus. Very few catalysts among the many of this type which have been proposed in the art produce polypropylenes having the required flexural modulus in yields sufficiently high to be economical. In addition, it is desirable to obtain a polymer which has a low xylenes-soluble content. Many known systems in the art result in the providing of one of the desired end results of the polymerization system but few provide a satisfactory polymer production level along with producing a polymer which has improved flexural modulus and also a decrease in the xylenes-soluble content thereof.

An object of this invention is to provide an improved catalyst.

Another object of the invention is to produce a polymer having an increase in flexural modulus and a decrease in xylenes-soluble content.

Another object is to provide a polymerization system wherein there is obtained a decrease in the amount of noncrystalline polymer formed, as measured by decrease in xylenes-soluble material.

Other objects and advantages will become apparent to those skilled in the art upon considering this disclosure.

In accordance with this invention, I have discovered that the addition of $BX_3$ to the binary 1-olefin polymerization catalyst system comprising an organoaluminum compound of the formula $AlR_3$ and a titanium trichloride-aluminum chloride complex having the approximate formula $TiCl_3 \cdot \frac{1}{3} AlCl_3$ results in an increase in flexural modulus of the polymer formed therewith as well as a decrease in the amount of noncrystalline polymer formed as measured by a decrease in xylenes-soluble material. A further improvement in the resulting ternary catalyst system is obtained by addition of $PX_n$ as an adjuvant thereto. In the formulae, X is selected from the group consisting of fluorine, chlorine, bromine, and iodine, and the X's are not necessarily the same—either in the two compounds or in the individual compounds; R is an alkyl, cycloalkyl, or aryl radical having 1 to 20 carbon atoms, or is a mixed radical such as alkaryl, aralkyl, alkylcycloalkyl, and the like; and $n$ is either 3 or 5.

Examples of boron and phosphorus compounds that can be used are boron trichloride, boron dichlorofluoride, boron triiodide, boron iododibromide, boron tribromide, boron trifluoride, boron bromodichloride, phosphrus trichlride, phosphorus dichlorobromide, phosphorus pentaiodide, phosphorus trichlorodiiodide, and the like. Examples of the $AlR_3$ compounds that can be used are trimethylaluminum, triethylaluminum, tricyclohexylaluminum, triphenylaluminum, tri(3 - cyclohexylbutyl)aluminum, trieicosylaluminum, dimethylcyclopentylbenzylaluminum, triisobutylaluminum, dimethylethylaluminum, diphenylcyclopentylaluminum, and the like. The titanium trichloride-aluminum chloride complex can be prepared by the reaction of titanium tetrachloride and aluminum, and has the approximate formula $TiCl_3 \cdot \frac{1}{3} AlCl_3$.

In forming the foregoing catalyst, the molar ratio of the $AlR_3$ compound to the titanium trichloride-aluminum chloride complex is within the range of 0.01:1 to 7.5:1, and preferably 0.1:1 to 5:1.

The molar ratio of the phosphorus and boron compounds to the titanium trichloride-aluminum trichloride complex is within the range of 0.01:1 to 7.5:1, preferably 0.1:1 to 5:1.

The total catalyst concentration is usually within the range of 0.005 to 10 weight percent of the olefin, but concentrations outside this range are operative.

Although the invention is illustrated by the polymerization of propylene, any aliphatic 1-olefin having up to 8 carbon atoms per molecule or mixtures thereof can be used, such as propylene, 1-butene, 1-pentene, 1-hexene, 3-methyl-1-butene, 4-methyl-1-pentene, 1-octene, and the like.

The polymerization reaction is carried out either in a mass system—i.e., the liquid olefin acts as reaction medium—or in an inert hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like. Mixtures of any of these diluents can be employed. Where an inert diluent is used, the volume ratio of diluent to olefin is in the range of 1:1 to 10:1, preferably 3:1 to 7:1.

The polymerization is conducted at temperatures in the range —60 to 350° F., preferably 100 to 200° F. The pressure is sufficient to maintain the reaction mixture substantially in liquid phase. The reaction time is in the range 10 minutes to 50 hours, more frequently 30 minutes to 25 hours.

It is within the scope of the invention to use hydrogen in a concentration of about 0.08 to 0.50 mol percent of the olefin, calculated as the amount present in the liquid phase, for controlling the molecular weight of the polymer.

EXAMPLE

The following example will serve to illustrate the invention, although it is not intended that the invention be limited thereto.

About 50 ml. (22–25 grams) of propylene dissolved in 250 ml. (158 grams) of pentane was polymerized at 122° F. and about 65 p.s.i.g., with 0.34 mol percent added hydrogen. The results obtained are given in the following table.

TABLE

| Run No. | Mol ratio [1] | | | | Catalyst, wt. percent [2] | Flexural modulus, p.s.i.×10⁻³ [3] | Xylenes-soluble, wt. percent [4] | Remarks [5] |
|---|---|---|---|---|---|---|---|---|
| | $AlR_3$ | $BX_3$ | $PX_n$ | $TiCl_3 \cdot \frac{1}{3} AlCl_3$ | | | | |
| 1 | 3 | 0 | 0 | 1 | 1.18 | 73 | 31.4 | |
| 2 | 3 | 1-$BF_3$ | 0 | 1 | 1.22 | 166 | 7.3 | |
| 3 | 2 | 1-$BCl_3$ | 0 | 1 | 1.09 | 230 | 4.6 | |
| 4 | 3 | 1-$BCl_3$ | 0 | 1 | 1.32 | 224 | 2.0 | |
| 5 | 4 | 1-$BCl_3$ | 0 | 1 | 1.55 | 191 | 4.2 | |
| 6 | 2.5 | 1-$BBr_3$ | 0 | 1 | 1.47 | 283 | 3.5 | |
| 7 | 3 | 1-$BBr_3$ | 0 | 1 | 1.59 | 278 | 3.1 | $AlR_3$ and $BX_3$ premixed. |
| 8 | 3.5 | 1-$BBr_3$ | 0 | 1 | 1.70 | 254 | 3.2 | |
| 9 | 4 | 1-$BBr_3$ | 0 | 1 | 1.82 | 227 | 3.6 | |
| 10 | 2.5 | 1-$BI_3$ | 0 | 1 | 1.75 | 303 | 2.3 | |
| 11 | 3 | 1-$BI_3$ | 0 | 1 | 1.87 | 271 | 2.2 | |
| 12 | 3.5 | 1-$BI_3$ | 0 | 1 | 1.98 | 93 | 20.3 | |
| 13 | 3 | 1-$BCl_3$ | 1-$PCl_3$ | 1 | 1.60 | 250 | 1.4 | $BCl_3$ and $PCl_3$ premixed. |
| 14 | 3 | 0 | 1-$PCl_3$ | 1 | 1.40 | 227 | 5.3 | |
| 15 | 3 | 1-$BBr_3$ | 0 | 1 | 1.87 | 265 | 3.2 | No premixing. |
| 16 | 3 | 1-$BCl_3$ | 0 | 1 | 1.32 | 44 | 38.9 | |
| 17 | 3 | 0 | 0 | 1 | 1.59 | 36 | 43.2 | |
| 18 | 3 | 1-$BBr_3$ | 0 | 1 | 2.10 | 230 | 5.5 | $AlR_3$ and $BX_3$ premixed. |
| 19 | 3 | 1-$BI_3$ | 0 | 1 | 2.37 | 205 | 8.0 | |

[1] $AlR_3$ is triethylaluminum in Runs 1–16, and is triisobutylaluminum in Runs 17–19.
[2] Based on propylene.
[3] ASTM D 790–61.
[4] Determined by placing 0.95 g. of polymer in a centrifuge tube, adding 95 ml. mixed xylenes, heating for 15 minutes at 285° F., cooling, centrifuging evaporating the solvent from a 25-ml. aliquot of the supernatant liquid, weighing the residue, and multiplying by 400.
[5] All runs were 17 hours in length except Runs 3–5, which were 64 hours, and Runs 1, 13, and 14, which were 22 hours.

The data in Runs 2–12, 15, 16, 18, and 19 show the results obtained with the ternary catalyst systems of my invention, and further show by comparison with control Runs 1 and 17 the increase in flexural modulus and decrease in xylenes-soluble material obtained.

Comparison of the data for Run 13, in which phosphorus trichloride was added as an adjuvant, with those for Run 4, show that addition of the adjuvant further increased flexural modulus and decreased xylenes-soluble material. The data for Run 14 show that simple substitution of phosphorus trichloride for boron trichloride does not result in the same improvement.

Comparison of the data for Runs 17 and 15, and Runs 4 and 16, respectively, show that premixing of the boron halide with the $AlR_3$ compound makes little if any difference in the case of liquid or solid halides but makes considerable difference in the case of gaseous halide. This is at least in part a function of the manner in which the runs were made. Part, if not all, of the boron trichloride was in the vapor space above the pentane diluent, whereas the boron tribromide was all in the pentane diluent. In a liquid-full system, such as for example a liquid propylene reaction system, premixing would have little effect.

The data in the three series of runs made at different $AlR_3/BX_3$ ratios (Runs 3–5, 6–9, and 10–12) show that the optimum ratio is in the range of 2:1 to 3:1. However, it is apparent that other ranges are operable, and give highly desirable results in comparison with the binary catalyst system.

Reasonable variations and modifications can be made, or followed, in view of the foregoing, without departing from the spirit and scope of this invention.

I claim:

1. A process which comprises polymerizing an aliphatic 1-olefin having from 3 to 8 carbon atoms per molecule in the presence of a catalyst which forms on mixing (a) a compound of the formula $AlR_3$ wherein R is a member of the group consisting of alkyl, aryl and cycloalkyl radicals having from 1 to 20 carbon atoms (b) a titanium trichloride-aluminum chloride complex having the approximate formula $TiCl_3 \cdot \frac{1}{3}AlCl_3$, (c) a compound of the formula $BX_3$, wherein X is a halogen, and (d) a compound of the formula $PX_n$ wherein X is a halogen and $n$ is an integer selected from the group consisting of 3 and 5 wherein the molar ratio of the $AlR_3$ compound to the titanium trichloride-aluminum chloride complex is within the range of 0.01:1 to 7.5:1, and preferably 0.1:1 to 5:1, and wherein the molar ratio of the phosphorus and boron compounds to the titanium trichloride-aluminum trichloride complex is within the range of 0.1:1 to 7.5:1, preferably 0.1:1 to 5:1.

2. A process according to claim 1 in which the catalyst is formed by mixing triethylaluminum, boron trichloride, phosphorus trichloride, and titanium trichloride-aluminum chloride complex.

3. A process according to claim 1 which comprises polymerizing propylene at a temperature in the range of −60 to 350° F.

4. A catalyst composition formed by mixing (a) a compound of the formula $AlR_3$ wherein R is a member of the group consisting of alkyl, aryl and cycloalkyl radicals having from 1 to 20 carbon atoms, (b) a titanium trichloride-aluminum chloride complex having the approximate formula $TiCl_3 \cdot \frac{1}{3}AlCl_3$, (c) a compound of the formula $BX_3$, wherein X is a halogen, and (d) a compound of the formula $PX_n$, wherein X is a halogen and $n$ is an integer selected from the group consisting of 3 and 5 wherein the molar ratio of the $AlR_3$ compound to the titanium trichloride-aluminum chloride complex is within the range of 0.01:1 to 7.5:1, and preferably 0.1:1 to 5:1, and wherein the molar ratio of the phosphorus and boron compounds to the titanium trichloride-aluminum trichloride complex is within the range of 0.01:1 to 7.5:1, preferably 0.1:1 to 5:1.

5. A catalyst composition according to claim 4 formed by mixing triethylaluminum, boron trichloride, phosphorus trichloride, and said titanium trichloride-aluminum chloride complex.

References Cited

UNITED STATES PATENTS

| | | | |
|---|---|---|---|
| 2,922,782 | 1/1960 | Hay | 260—94.9 |
| 3,225,021 | 12/1965 | Erchak | 260—93.7 |
| 3,251,819 | 5/1966 | Ketley | 260—93.7 |
| 3,317,502 | 5/1967 | Harban et al. | 260—93.7 |
| 3,326,883 | 6/1967 | Kelley et al. | 260—94.9 |
| 3,328,375 | 6/1967 | Price | 260—93.7 |
| 3,342,793 | 9/1967 | Palvarini et al. | 260—93.7 |

FOREIGN PATENTS

| | | |
|---|---|---|
| 846,731 | 8/1960 | Great Britain. |
| 3,615,287 | 8/1961 | Japan. |

JOSEPH L. SCHOFER, *Primary Examiner.*

M. B. KURTZMAN, *Assistant Examiner.*

U.S. Cl. X.R.

252—429; 260—88.2

UNITED STATES PATENT OFFICE
CERTIFICATE OF CORRECTION

Patent No. 3,444,153                 May 13, 1969

Lawrence M. Fodor

It is certified that error appears in the above identified patent and that said Letters Patent are hereby corrected as shown below:

Column 4, line 7, "0.1:1 to 7.5:1" should read -- 0.01:1 to 7.5:1 --.

Signed and sealed this 4th day of November 1969.

(SEAL)
Attest:

Edward M. Fletcher, Jr.              WILLIAM E. SCHUYLER, JR.
Attesting Officer                     Commissioner of Patents